(12) United States Patent
Kitai (10) Patent No.: US 12,132,982 B2
(45) Date of Patent: Oct. 29, 2024

(54) DISPLAY CONTROL APPARATUS CAPABLE OF SWITCHING BETWEEN DISPLAY MODES, CONTROL METHOD THEREOF, AND STORAGE MEDIUM

(71) Applicant: CANON KABUSHIKI KAISHA, Tokyo (JP)

(72) Inventor: Shimpei Kitai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/358,149

(22) Filed: Jul. 25, 2023

(65) Prior Publication Data

US 2024/0048841 A1 Feb. 8, 2024

(30) Foreign Application Priority Data

Aug. 2, 2022 (JP) ................................. 2022-123520

(51) Int. Cl.
*H04N 23/63* (2023.01)
*G09G 5/00* (2006.01)

(52) U.S. Cl.
CPC .......... *H04N 23/634* (2023.01); *G09G 5/006* (2013.01); *H04N 23/631* (2023.01); *G09G 2310/0232* (2013.01); *G09G 2320/0686* (2013.01); *G09G 2340/045* (2013.01); *G09G 2354/00* (2013.01)

(58) Field of Classification Search
CPC ....................................................... G09G 5/006
See application file for complete search history.

(56) References Cited

FOREIGN PATENT DOCUMENTS

JP             6801618 B2    12/2020

*Primary Examiner* — Gustavo Polo
(74) *Attorney, Agent, or Firm* — Cowan, Liebowitz & Latman, P.C.

(57) ABSTRACT

A display control apparatus including a display unit, comprising a receiving unit configured to receive a tally signal from an external apparatus, and a display control unit configured to perform control so that a captured image captured by an imaging unit is displayed on a display unit, wherein the display control unit performs control, in accordance with the receiving unit having received the tally signal, so that a display item that indicates that the tally signal has been received is displayed along the edge of the display unit, and performs control, in accordance with a display mode of the captured image, so that the display item is displayed with a different width.

16 Claims, 7 Drawing Sheets

DISPLAY CONTROL APPARATUS CAPABLE OF SWITCHING BETWEEN DISPLAY MODES, CONTROL METHOD THEREOF, AND STORAGE MEDIUM

BACKGROUND OF THE INVENTION

Field of the Invention

The present invention relates to a display control apparatus, a control method thereof, and a storage medium.

Description of the Related Art

In image capturing using a plurality of video cameras, there is known a configuration in which a tally signal is transmitted to a video camera that is capturing a main video (for example, a video being used for broadcasting), and the video camera that has received the tally signal turns on a tally lamp. With this configuration, a videographer can know whether or not the video of the camera that he or she is using is being used as the main video (for example, whether or not the video is being used for broadcasting). Also, Japanese Patent No. 6801618 discloses a configuration in which, in a case where a tally signal is received, information of the tally signal is displayed together with a captured image by changing a color of a peripheral portion of the image displayed on the display unit.

According to Japanese Patent No. 6801618, in a case where a video camera receives a tally signal, the operator is notified of whether or not the video of the video camera is in use by changing a display form of a screen in which a captured image is being displayed, such as displaying a band-shaped frame in a peripheral portion of the video. Meanwhile, in the peripheral portion of the video displayed on the screen, image capture information such as resolution, frame rate, time code, and exposure may be displayed in an OSD overlapping the video. In this case, when the display of the band-shaped frame corresponding to the tally signal and the OSD display of the image capture information overlap such that they deviate from each other, a portion overlaps with the frame display and a portion does not overlap with OSD display, and thus there is a problem that the visibility of the image capture information deteriorates.

SUMMARY OF THE INVENTION

The present invention provides a technique for achieving both visibility of a display notifying that a tally signal has been received and visibility of display of image capture information on a screen for displaying a captured image.

According to one aspect of the present invention, there is provided a display control apparatus including a display unit, the apparatus comprising: a receiving unit configured to receive a tally signal from an external apparatus; and a display control unit configured to perform control so that a captured image captured by an imaging unit is displayed on the display unit and, in accordance with the receiving unit having received the tally signal, to perform control so that a display item that indicates that the tally signal has been received is displayed along the edge of the display unit, wherein the display control unit performs control, in accordance with a display mode of the captured image, so that the display item is displayed with a different width.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
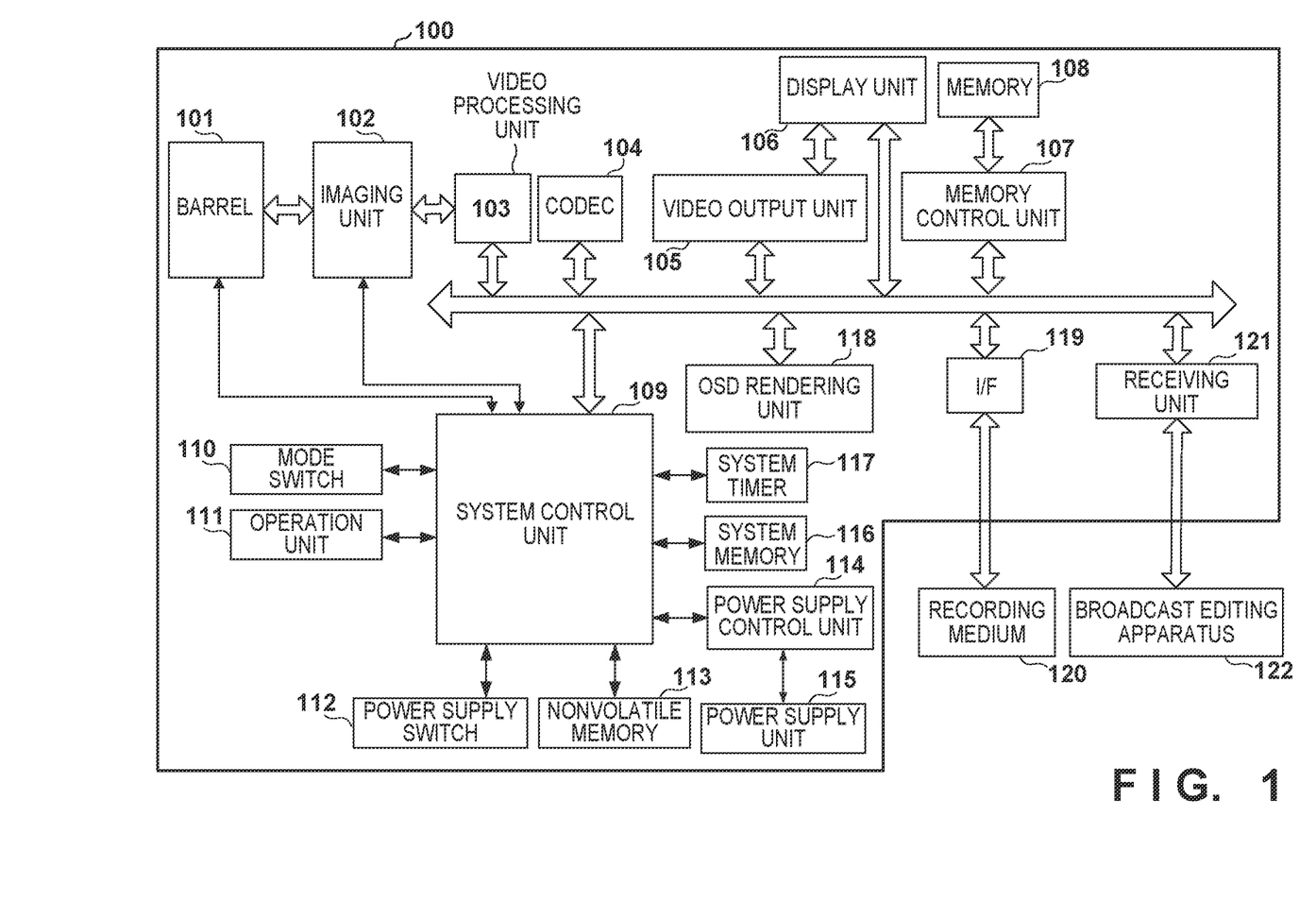
FIG. 1 is a block diagram illustrating a configuration example of an image capture apparatus according to an embodiment.

FIG. 1 is a block diagram illustrating a configuration example of a digital video camera (hereinafter, referred to as a video camera 100) as an image capture apparatus according to an embodiment. A barrel 101 includes an imaging lens including a focus lens or an anti-vibration lens, and an aperture. The barrel 101 may be integrated with or separable from the housing of the video camera 100. An imaging unit 102 includes an imaging sensor that converts an optical image collected by the lens of the barrel 101 into an electric signal, and an A/D converter that converts an analog signal into a digital signal.

A video processing unit 103 processes video data (captured images) from the imaging unit 102 or video data from a memory control unit 107. The video processing unit 103 performs, for example, resizing processing, trimming processing, color conversion processing, distortion correction processing, and the like on the video data, and generates image data (display data) for display on a display unit 106. The video processing unit 103 stores display data in a VRAM reserved in a memory 108 via the memory control unit 107. Further, the video processing unit 103 performs predetermined calculation processing (including a function of detecting a subject such as a face) using the video data from the imaging unit 102, and generates information for a system control unit 109 to perform AE (automatic exposure) processing, AF processing (auto-focus) processing, and anti-shake processing. The video processing unit 103 further performs predetermined calculation processing using the captured video data, and performs AWB (auto white balance) processing based on the obtained calculation result. Additionally, the video processing unit 103 inputs video data obtained by decoding video data encoded by a CODEC 104, performs resizing processing and color conversion processing, then performs processing to generate new display data.

The CODEC 104 encodes the display data generated by the video processing unit 103 by a moving image compression method such as MPEG2 or H.264. Further, the CODEC 104 decodes the encoded video data obtained from the memory control unit 107, and passes the decoded video data to the memory control unit 107 as display data. The video output unit 105 reads the display data stored in the memory 108 (VRAM) via the memory control unit 107, and converts the data into a video signal. In addition, the video output unit 105 can add metadata determined by the system control unit 109 to the generated video signal.

The display unit 106 displays a video signal received from the video output unit 105 on a screen. The memory control unit 107 has a function of arbitrating an access request from each block to the memory 108. The memory 108 stores video data handled by the video processing unit 103, the CODEC 104, the video output unit 105, and an OSD rendering unit 118. Therefore, a plurality of pieces of video data (display data) to be displayed by the video output unit 105 on the display unit 106 are stored in the VRAM of the memory 108. The video output unit 105 overlaps the video data and converts it into a video signal, and supplies the video signal to the display unit 106. The memory 108 also has a function of temporarily storing encoded video data outputted from the CODEC 104 and encoded video data read from the recording medium 120. The memory 108 has a recording capacity sufficient to store moving images and sounds of a predetermined period of time.

The system control unit 109 includes one or a plurality of processors and controls the entire video camera 100. The one or a plurality of processors of the system control unit 109 read and execute a program recorded in a nonvolatile memory 113 to thereby control each unit of the video camera 100 and realize each operation of the present embodiment. Note, the system control unit 109 may include a plurality of CPU cores. In this case, tasks written in the program can be shared and processed by a plurality of CPU cores.

A mode switch 110 is a switch for selecting an operation mode of the video camera 100. The mode switch 110 determines one of a camera mode, a reproduction mode, or the like according to the switch position, and notifies the system control unit 109 of the determined mode. The operation unit 111 is used by a user to input various operation instructions to the system control unit 109. The operation unit 111 includes various machine switching buttons such as a menu button, a cancel button, a 4-direction key (upward key, downward key, leftward key, and rightward key), a SET button, and an AF/MF. In addition, the operation unit 111 includes a REC button for performing an instruction to start/stop recording, and an assigned button to which a function can be assigned by a menu setting. For example, when a menu button is pressed, a menu screen capable of various settings is displayed on the display unit 106. The user can intuitively perform various settings by using the menu screen displayed on the display unit 106, and the 4-direction key or the SET button.

A power supply switch 112 is a switch for switching a power supply on and the power supply off, and is configured by, for example, a press-button switch. The nonvolatile memory 113 is a memory that maintains stored contents in a state in which the power supply is not supplying power. In the present embodiment, the nonvolatile memory 113 is, for example, an EEPROM, and can be electrically erased and recorded. In the nonvolatile memory 113, constants, programs, and the like for the operation of the system control unit 109 are recorded. Here, a program for executing various flowcharts described later in the present embodiment is included for the program.

A power supply control unit 114 includes a battery detection circuit, a DC-DC converter, a switching circuit for switching an energizing block, and the like. In addition, the power supply control unit 114 detects whether or not a battery is mounted, the type of the battery, and a remaining battery amount. Further, the power supply control unit 114 controls the DC-DC converter based on a detection result and an instruction from the system control unit 109, and supplies a required voltage to each unit within the video camera 100 including the recording medium 120 for a required period. A power supply unit 115 includes a primary battery such as an alkaline battery or a lithium battery, a secondary battery such as a NiCd battery, a NiMH battery, or an Li battery, an AC adapter, and the like.

A system memory 116 is configured by, for example, a RAM. In the system memory 116, constants, variables, programs read from the nonvolatile memory 113, and the like for the operation of the system control unit 109 are loaded and held. The system memory 116 may be common to the memory 108. In this case, since access is arbitrated by the memory control unit 107, a low capacity memory that can be accessed at a high speed and is separately, directly connected to the system control unit 109 may be provided. The system timer 117 is a clock unit that measures the time used for various control and the time of a built-in clock.

The OSD rendering unit 118 renders a character or a symbol (including a character string, an icon, various markers, various frames, and the like) indicating an image capture state (including an operation state and a setting state) of the video camera 100 to video data loaded in the VRAM on the memory 108. Hereinafter, characters or symbols will be described as characters/symbols. An image of a character/symbol is stored in the nonvolatile memory 113, and is read by the OSD rendering unit 118 and rendered to VRAM. Hereinafter, displaying characters/symbols on the screen of the display unit 106 by the OSD rendering unit 118 is also referred to as an OSD display. An OF 119 is an interface that connects the recording medium 120, which may be a memory card or a hard disk, and the video camera 100.

The recording medium 120 is connected to the video camera 100 via the I/F 119, and records encoded video data stored in the memory 108. In addition, the encoded video data recorded on the recording medium 120 and the data associated therewith can be transferred to the memory 108 via the I/F 119. The recording medium 120 may be a memory card, a hard disk drive, or a disk attached to the video camera 100, or may be a flash memory or a hard disk drive incorporated in the video camera 100.

The receiving unit 121 receives a signal from an external apparatus connected to the video camera. For example, the receiving unit 121 receives a tally signal from a broadcast editing apparatus 122 which is an external apparatus, and notifies the system control unit 109 of the received tally signal. Note, the communication connection between the receiving unit 121 and the external apparatus may be wired or wireless. The system control unit 109 can cause the OSD rendering unit 118 to render an icon indicating that the tally signal has been received in accordance with the content of the notified tally signal and a frame in which the color of the peripheral portion of the image displayed on the display unit 106 is changed. The broadcast editing apparatus 122 has functions of, for example, a switcher, a mixer, and a television monitor. A plurality of video cameras are connected to the broadcast editing apparatus 122, and a video to be used for broadcasting is selected from video signals of the plurality of video cameras. The broadcast editing apparatus 122 transmits a tally signal indicating that the video is being used as a broadcast video to the video camera that is capturing the selected video.

Figure 2A:
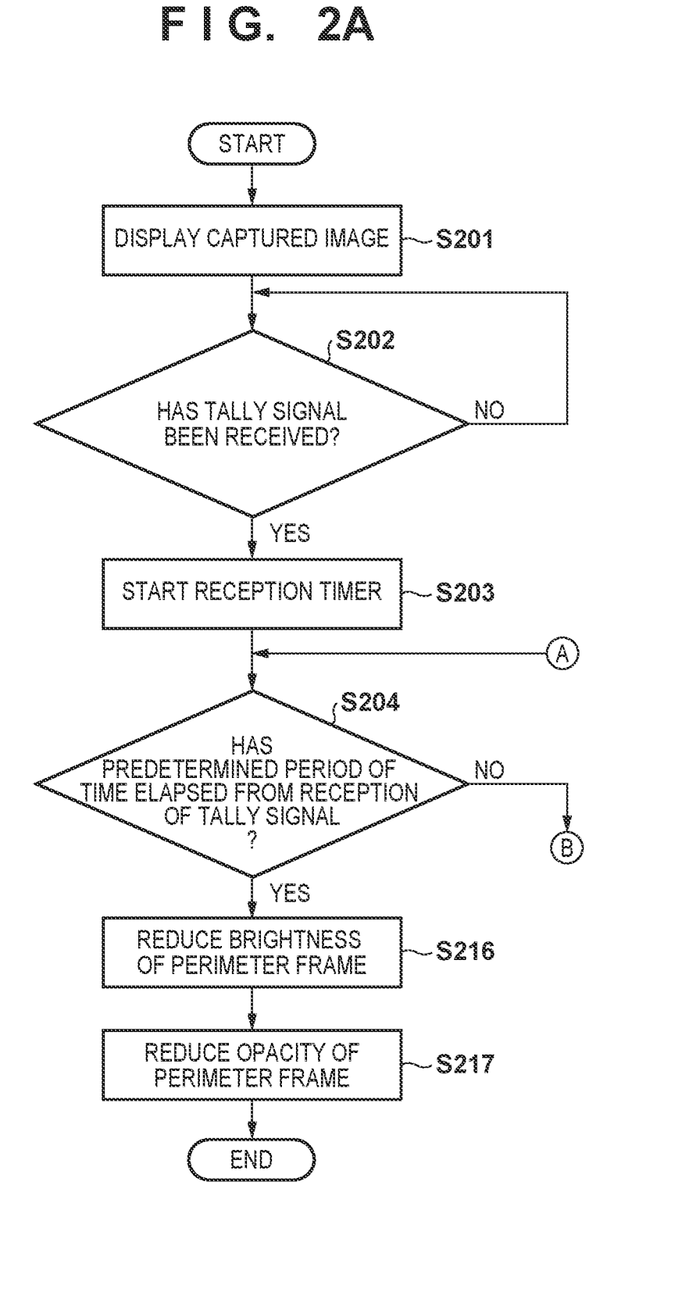
FIGS. 2A and 2B are flowcharts illustrating an operation of the image capture apparatus according to the embodiment.
Figure 2B:
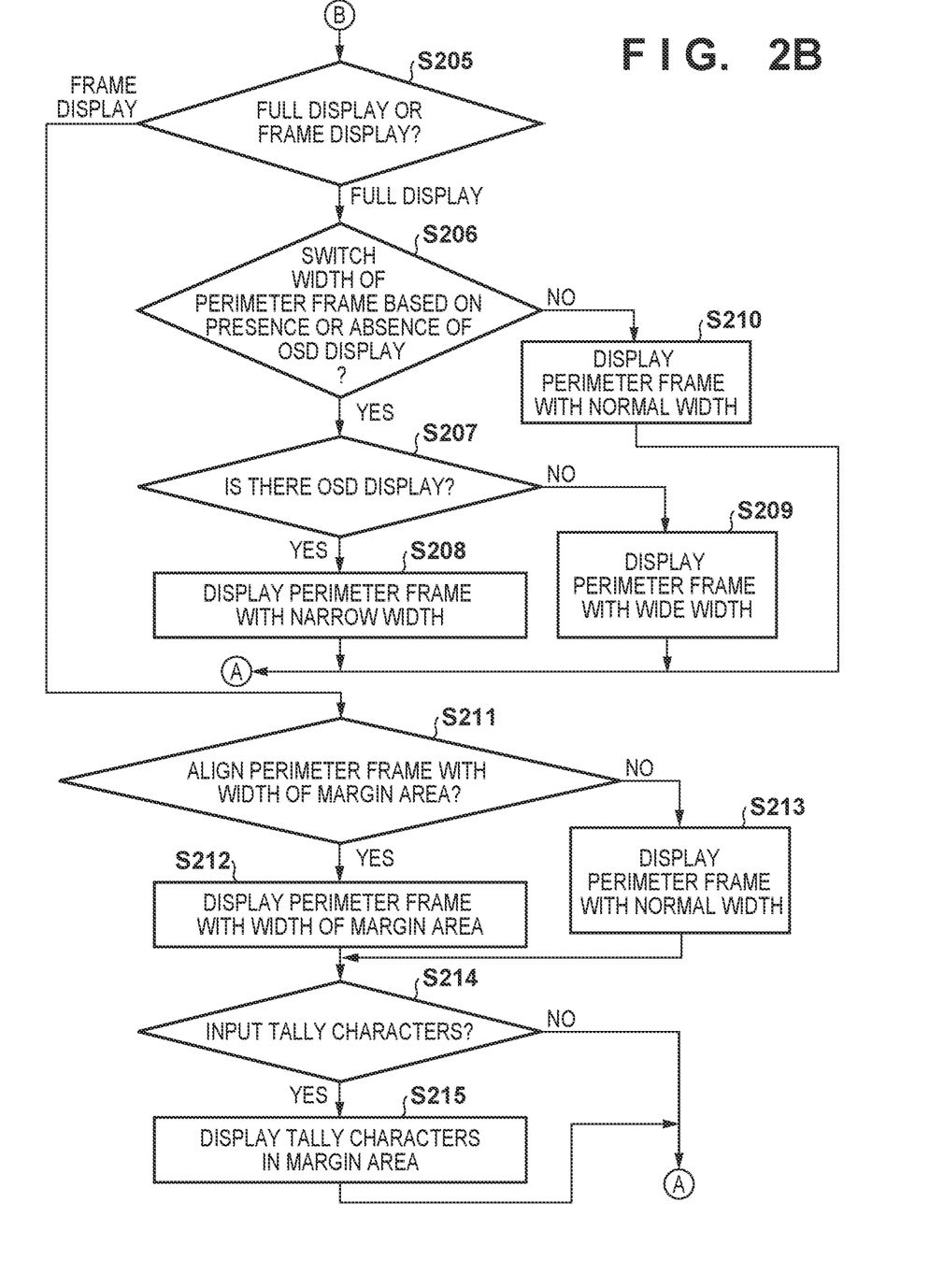

Display control on the display unit 106 by the video camera 100 of the present embodiment having the above-described configuration will be described. The video camera 100 of the present embodiment displays, along the perimeter of the screen of the display unit 106, a perimeter frame indicating that a tally signal has been received, the perimeter frame having a different width in accordance with a display state of a captured image or characters/symbols on the screen. Note, the display control of the display unit 106 is performed, for example, by the system control unit 109 controlling the memory 108, the OSD rendering unit 118, and the video output unit 105. FIGS. 2A and 2B are flowcharts illustrating an example of display control by the video camera 100 (the system control unit 109).

Figure 3A:
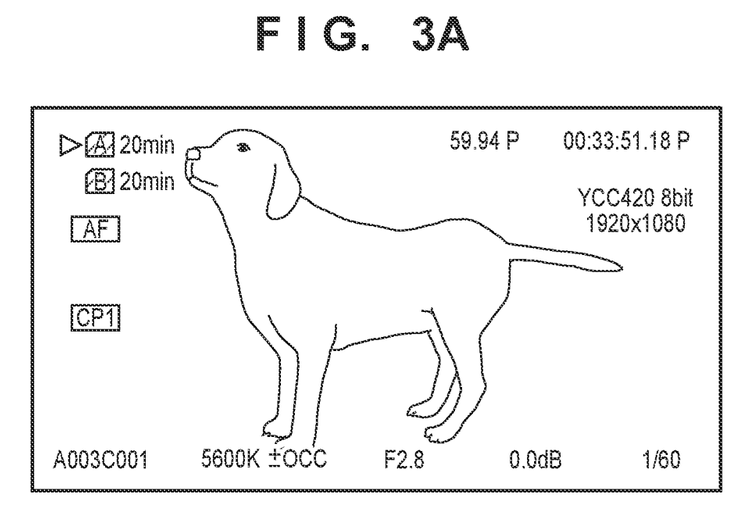
FIGS. 3A to 3D are views illustrating exemplary displays of a display unit in which a full display is being performed.

In step S201, the system control unit 109 controls the video output unit 105 so as to output an image captured by the imaging unit 102 and processed by the video processing unit 103 to the display unit 106. The captured image processed by the video processing unit 103 is stored in the VRAM on the memory 108 as display data, and the video output unit 105 reads the display data from the VRAM and provides it to the display unit 106. The display unit 106 displays the captured image on the screen based on the display data. Under the control of the system control unit 109, the OSD rendering unit 118 renders characters/symbols on the display data stored in the VRAM. As a result, the characters/symbols rendered by the OSD rendering unit 118 are displayed on the screen of the display unit 106 together with the captured image. FIG. 3A is an exemplary display of a captured image on the display unit 106 in a case where no tally signal has been received. Characters/symbols rendered by the OSD rendering unit 118 are being displayed in the vicinity of the perimeter of the captured image. Note that the display positions of these characters/symbols are positions spaced apart from the perimeter of the screen by a predetermined distance. As a result, a space for displaying a perimeter frame indicating reception of the tally signal is formed.

In step S202, the system control unit 109 determines whether a tally signal has been received via the receiving unit 121. In a case where it is determined that the tally signal has been received (YES in step S202), the processing transitions to step S203. On the other hand, a case where it is determined that the tally signal has not been received (NO in step S202), the system control unit 109 repeats the processing of step S202 and waits for the tally signal to be received. In step S203, the system control unit 109 starts a reception timer for measuring the elapsed time since the tally signal has been received by using the system timer 117.

In step S204, it is determined whether or not the reception timer that started in step S203 has expired and a certain period of time has elapsed since the tally signal was received. Configuration may be taken such that the predetermined time can be set by the user through a menu or the like using the operation unit 111. When the reception timer started in step S203 detects that a predetermined period of time set beforehand has elapsed, the system timer 117 notifies the system control unit 109 of this. The system control unit 109 repeats the processing of step S205 to step S215 until it is determined by the reception timer that a predetermined period of time set beforehand has elapsed (during NO in step S204). When it is determined that the predetermined time has elapsed (YES in step S204), the processing transitions to step S216.

Figure 4A:
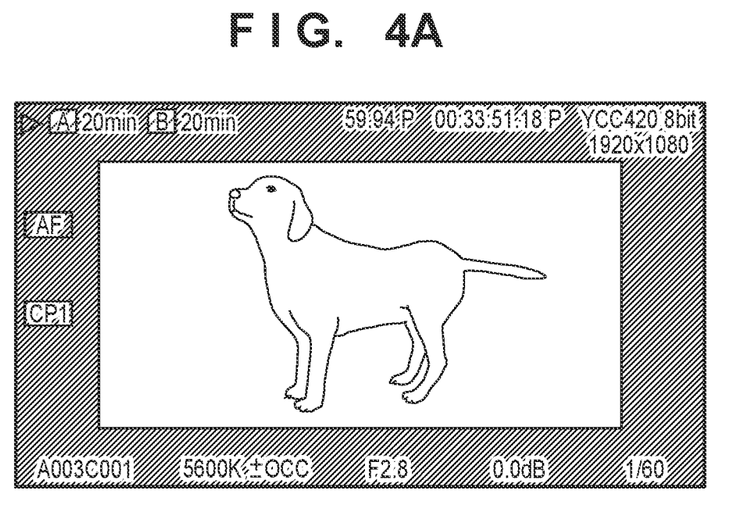
FIGS. 4A to 4D are views illustrating exemplary displays of a display unit in which a frame display is being performed.

The system control unit 109 can switch the display mode for displaying the image captured by the imaging unit 102 on the screen of the display unit 106. For example, the system control unit 109 can switch between a full display in which the captured image is displayed on the entire screen of the display unit 106 and a frame display in which the captured image is displayed smaller than the screen and a margin area is provided around the captured image. Also, the system control unit 109 can switch between modes in which the OSD display is performed to display image capture information and a mode in which the OSD display is not performed, as the display modes. The display mode can be switched by, for example, a user operation. FIG. 3A is an exemplary display of a captured image by a full display. FIG. 4A is an exemplary display of a captured image by a frame display. Characters/symbols by the OSD display are displayed so as to fall within the range of the margin area. Switching between the full display and the frame display can be specified by the user via the operation unit 111. In step S205, the system control unit 109 determines whether a captured image is being displayed by the full display or a captured image is being displayed by the frame display. In the case of the full display, the processing transitions to step S206, and in the case of the frame display, the processing transitions to step S211.

In a case where the full display is being performed, in step S206, the system control unit 109 determines whether or not the setting for changing the width of the perimeter frame to be displayed at the time of receiving the tally signal in accordance with the presence or absence of the OSD display is enabled. Enabling and disabling of this setting can be switched by the user via the operation unit 111. In a case where this setting is enabled (YES in step S206), the processing transitions to step S207, and in a case where this setting is disabled (NO in step S206), the processing transitions to step S210. In step S207, the system control unit 109 determines whether or not the OSD display is being performed on the display unit 106. In a case where the OSD display is being performed (YES in step S207), the processing transitions to step S208, and in a case where the OSD display is not being performed (No in step S207), the processing transitions to step S209. Note, the system control unit 109 switches the presence or absence of the OSD display on the display unit 106 in accordance with the content operated by the operation unit 111. The switching of the presence or absence of the OSD display may be set by a menu or may be switched by a key operation such as an assigned button.

Figure 3B:
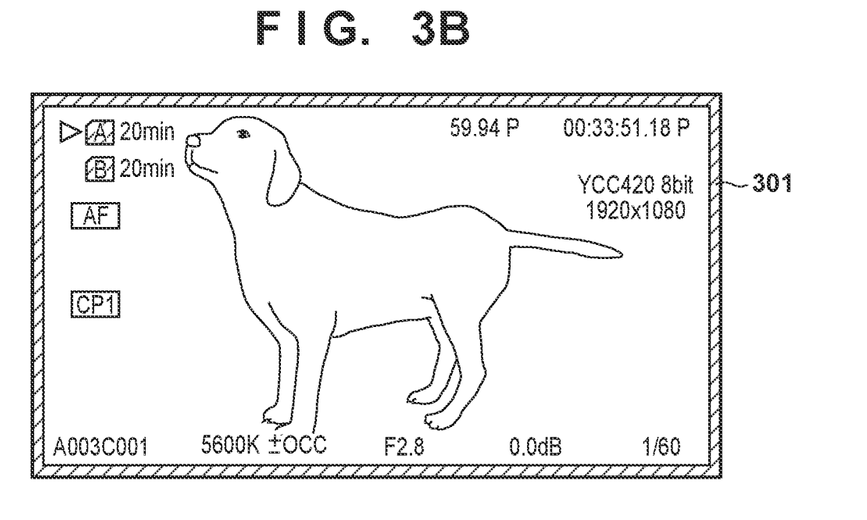

In step S208, the system control unit 109 displays a perimeter frame indicating that a tally signal has been received on the screen of the display unit 106 on which the OSD display is being performed. The perimeter frame is displayed by causing the OSD rendering unit 118 to render the perimeter frame. Here, the perimeter frame is displayed with a narrow width so as not to reduce the visibility of the OSD display. FIG. 3B shows an example of a screen of a perimeter frame on a display in which a full display is being performed in a case where the tally signal is received. In FIG. 3B, a perimeter frame 301 indicating reception of the tally signal is being displayed with a narrow width along the perimeter of the captured image so as not to overlap with the characters/symbols by the OSD display. That is, the perimeter frame 301 is displayed with a width that does not overlap with the display of the characters/symbols between the edge of the screen and the display of the characters/symbols. Thus, a reduction in visibility of OSD displayed by the perimeter frame 301 is avoided. In addition, the system control unit 109 changes the color of a perimeter frame 401 in accordance with the content represented by the received tally signal. For example, the perimeter frame 401 is displayed in red when the tally signal indicates "program", green when the signal indicates "preview", and orange when the signal indicates "program+preview". Note that the width of the perimeter frame 401 may be changed so not to overlap with OSD display in accordance with the type of OSD display being displayed on the display unit 106 (for example, the size of characters, icons, the display position, and the like). That is, configuration may be taken such that the system control unit 109 dynamically sets the width of the perimeter frame 301 in accordance with the distance between the edge of the screen and the display of the characters/symbols being displayed on the screen.

Figure 3C:
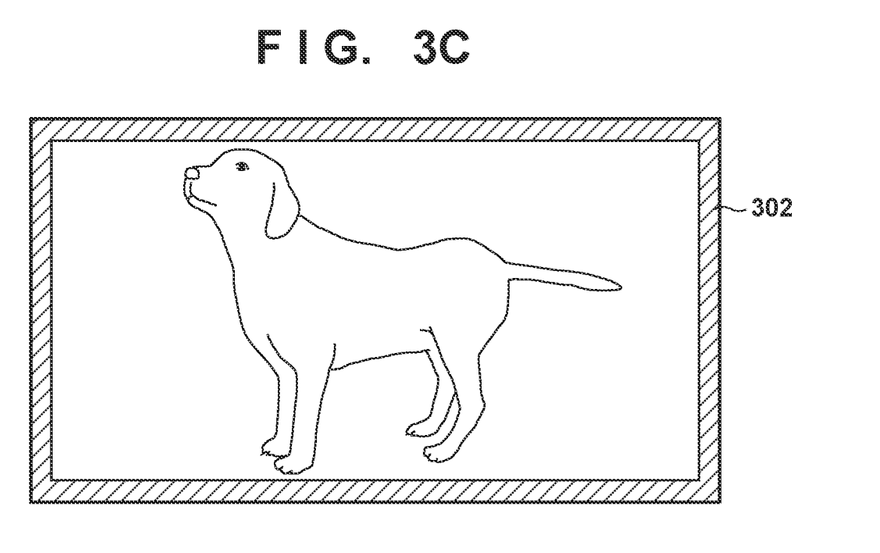
Figure 3D:
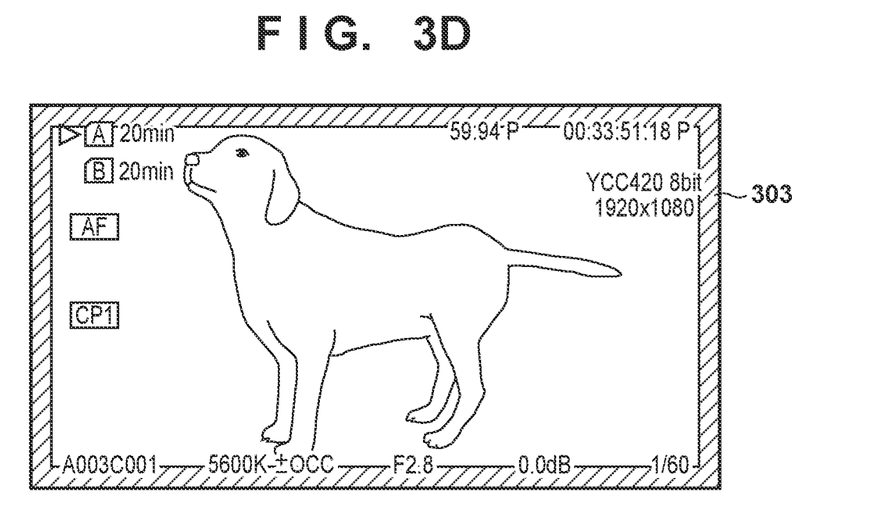

In step S209, the system control unit 109 displays a perimeter frame indicating that a tally signal has been received on the screen of the display unit 106 on which the OSD display is not being performed. FIG. 3C is an example of a perimeter frame indicating that a tally signal has been received, which is displayed on a screen where the OSD display is not being performed. The perimeter frame 302 has a wider width than the perimeter frame 301 (FIG. 3B) displayed in step S208. Also, in a case where the setting for switching the width of the perimeter frame in accordance with the presence or absence of the OSD display has not been performed, the system control unit 109 displays, on the display unit 106, the perimeter frame indicating that the tally signal has been received at a predetermined width (hereinafter referred to as a normal width) in step S210 regardless of the presence or absence of the OSD display. FIG. 3D is an example in which a perimeter frame indicating that a tally signal has been received is displayed on a screen on which the display of the entire captured image and the OSD display are being performed according to the processing of step S210. A perimeter frame 303 is displayed with a normal width regardless of whether or not the OSD display is being performed on the screen of the display unit 106. Note that the normal width is larger than the width of the perimeter frame (for example, the perimeter frame 301 of FIG. 3B) displayed in step S208. Also, the normal width may be narrower, wider, or the same as the width of the perimeter frame (for example, the perimeter frame 302 of FIG. 3C) displayed in step S209. When the processing of step S209 and step S210 ends, the processing returns to step S204.

Next, processing when it is determined in step S205 that the display of the captured images on the display unit 106 is a frame display will be described. In the frame display, a captured image is displayed on the display unit 106 at a size smaller than that of the screen, and a margin area where the captured image is not displayed is generated around the captured image. As described above, whether or not to perform the frame display is instructed by a user operation. For example, the execution of the frame display may be set from a menu, or may be set by an operation on an assigned button of the operation unit 111 to which the frame display switching function is assigned. FIG. 4A is an example of a frame display on the display unit 106 in a state where no tally signal has been received. In the frame display, the captured image is reduced to an image smaller than the size of the screen of the display unit 106 and displayed in the center of the screen, so that the OSD display can be performed in a margin area around the captured image.

In a case where the frame display is being performed, in step S211, the system control unit 109 determines whether a setting of aligning the perimeter frame indicating that the tally signal has been received with the width of the margin area at the time of frame display is enabled. Regarding this setting, the user can arbitrarily set whether it is enabled or disabled by a menu or the like via the operation unit 111. This setting is maintained even after the power supply of the camera is turned OFF, and the setting content is maintained even after the power supply is turned on the next time. In a case where it is determined that the setting of aligning the width of the perimeter frame with the width of the margin area is enabled (YES in step S211), the processing transitions to step S212. Also, in a case where it is determined that the setting is disabled (NO in step S211), the processing transitions to step S213.

Figure 4B:
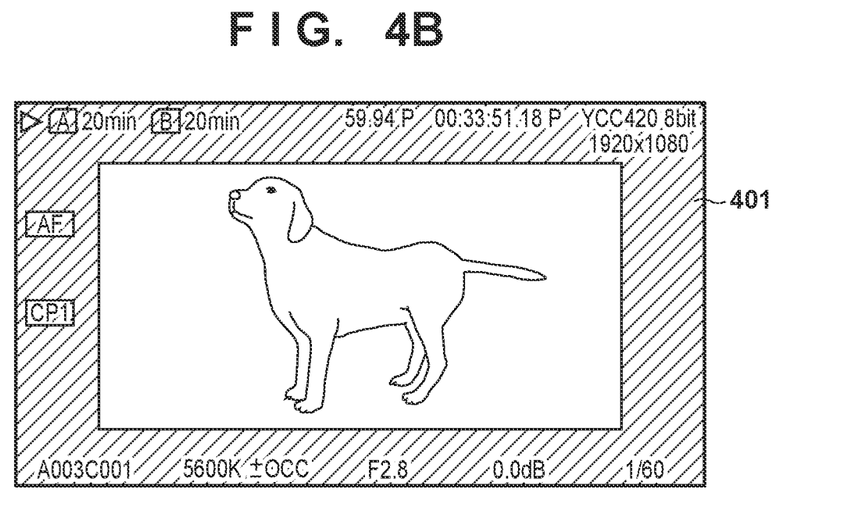

In a case where the setting of aligning the width of the perimeter frame with the width of the margin area is enabled, in step S212, the system control unit 109 displays the perimeter frame indicating that the tally signal has been received with the width corresponding to the width of the margin area in the frame display. FIG. 4B is an example in which, in a case where a tally signal has been received, the width of the perimeter frame 401 is matched with the width of the margin area in the frame display. In contrast, in a case where the setting of aligning the width of the perimeter frame with the width of the margin area is disabled, in step S213, the system control unit 109 displays the perimeter frame indicating that the tally signal has been received with a normal width on the screen of the display unit 106. Note, in the present embodiment, the width of the perimeter frame displayed in step S210 is the same as the width of the perimeter frame displayed in step S213, but the present disclosure is not limited to this.

Figure 4C:
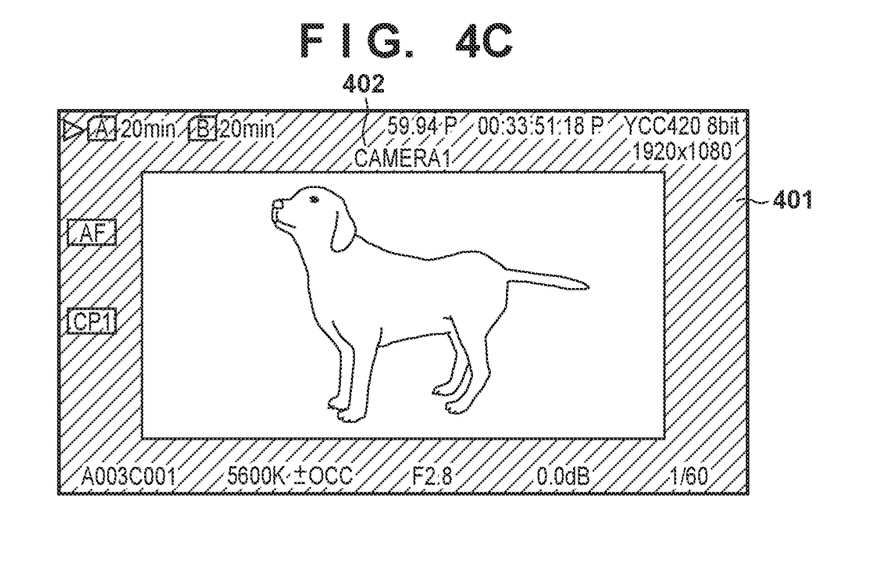

In step S214, the system control unit 109 determines whether or not information of the character string (a tally character string) is received when the tally signal is received. In a case where it is determined that the tally character string has been received (YES in step S214), the processing transitions to step S215. Conversely, in a case where it is determined that the tally character string has not been received (NO in step S214), the processing returns to step S204. In step S215, the system control unit 109 causes the OSD rendering unit 118 to render the tally character string included in the tally signal. FIG. 4C illustrates an example in which the tally character string and the perimeter frame indicating the reception of the tally signal are displayed on the screen during the frame display. The tally character string 402 is displayed inside the perimeter frame arranged in a margin area of the frame display. Then the processing returns to step S204.

Figure 4D:
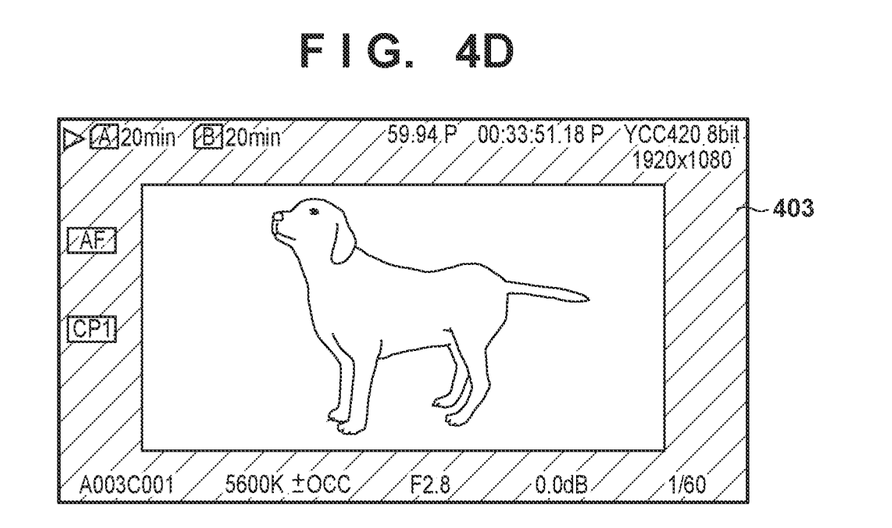

In step S204, when it has been detected that a predetermined period of time set beforehand has elapsed from the reception of the tally signal by the reception timer (YES in step S204), the processing transitions to step S216. In step S216, the system control unit 109 reduces the brightness of the color of the perimeter frame indicating the reception of the tally signal displayed on the display unit 106. Note that the brightness at this time is adjusted so that, for example, a color corresponding to the content of the tally signal can be determined by the user, and the OSD display (character/symbol) in the margin area of the frame display can be more easily seen. Next, in step S217, the system control unit 109 reduces opacity of the color of the perimeter frame indicating the reception of the tally signal displayed on the display unit 106. Note that the opacity at this time is adjusted so that, for example, a color corresponding to the content of the tally signal can be determined by the user, and the OSD display (characters/symbols) and the like in the margin area of the frame display can be more easily seen. FIG. 4D is an example in which, in a case where the tally signal has been received, the perimeter frame 403 having reduced brightness and opacity is displayed in the margin area of the frame display. Note, in the above description, the adjustment of the brightness and the opacity of the perimeter frame using the margin area in the frame display has been described, but it is similar for the perimeter frame in the full display. Also, configuration may be taken such that the amount of reduction in brightness by the processing of step S216 and the amount of reduction in opacity by processing of step S217 can be set by the user. The above processing further improves visibility for the user, even for an OSD display (characters/symbols) using the same group of colors.

After this, upon detecting that no tally signal has been received, the system control unit 109 erases the perimeter frame representing the reception of the tally signal. Then, the system control unit 109 starts the processing illustrated in FIGS. 2A and 2B and waits for reception of a subsequent tally signal. Note that the tally signal may be received as a signal indicating that an ON state will be maintained or as a signal indicating start and end.

As described above, by virtue of the embodiment, visibility of a display notifying that a tally signal has been received and visibility of a display of image capture information on a screen for displaying a captured image can both be achieved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-123520, filed Aug. 2, 2022, which is hereby incorporated by reference herein in its entirety.

What is claimed is:

1. A display control apparatus including a display unit, the apparatus comprising:
a receiving unit configured to receive a tally signal from an external apparatus; and
a display control unit configured to perform control so that a captured image captured by an imaging unit is displayed on the display unit and, in accordance with the receiving unit having received the tally signal, to perform control so that a display item that indicates that the tally signal has been received is displayed along the edge of the display unit, wherein
the display control unit switches, in accordance with a user operation, between a full display in which the captured image is displayed on the entirety of a screen of the display unit and a frame display in which a margin area around the captured image is provided by displaying the captured image smaller than the screen,
the display control unit changes the width of the display item between the full display and the frame display, and
the display control unit displays the display item with a width smaller than the display item displayed for the frame display in a case where the captured image is being displayed by the full display.

2. The display control apparatus according to claim 1, wherein the display item is a frame displayed along the edge of the display unit.

3. The display control apparatus according to claim 1, wherein the display control unit performs control, in accordance with a plurality of display modes with different display areas for the captured image, so that the display item is displayed with a different width.

4. The display control apparatus according to claim 1, wherein the display control unit displays the display item with a width corresponding to the width of the margin area in a case where the captured image is being displayed by the frame display.

5. The display control apparatus according to claim 4, wherein the display control unit displays information relating to image capturing within a range of the margin area.

6. The display control apparatus according to claim 1, wherein the display control unit performs display of information received along with the tally signal in the margin area in a case where the captured image is being displayed by the frame display.

7. The display control apparatus according to claim 1, wherein the display control unit
overlaps and displays information relating to image capturing at the edge of the captured image, and
in accordance with the receiving unit having received the tally signal, displays the display item with a width that does not overlap the display of the information when displaying the display item.

8. The display control apparatus according to claim 7, wherein the display control unit changes, in accordance with the display of the information that overlaps the captured image on the display unit, the width of the display item in a case where the captured image is being displayed by the full display.

9. The display control apparatus according to claim 8, wherein the display control unit determines the width of the display item in accordance with a distance from the edge of the captured image to the display of the information.

10. The display control apparatus according to claim 1, wherein the display control unit displays the display item with a different color in accordance with content that the tally signal indicates.

11. The display control apparatus according to claim 1, wherein brightness of a color of the display item is reduced after a predetermined time has elapsed from the start of the display of the display item.

12. The display control apparatus according to claim 1, wherein an opacity of a color of the display item is reduced after a predetermined time has elapsed from the start of the display of the display item.

13. The display control apparatus according to claim 1, wherein an image capture apparatus has the imaging unit.

14. A control method of a display control apparatus including a display unit, the method comprising:
- receiving a tally signal from an external apparatus; and
- performing control so that a captured image captured by an imaging unit is displayed on the display unit and performing control, in accordance with having received the tally signal, so that a display item that indicates that the tally signal has been received is displayed along the edge of the display unit, wherein
- display of the captured image is changed, in accordance with a user operation, between a full display in which the captured image is displayed on the entirety of a screen of the display unit and a frame display in which a margin area around the captured image is provided by displaying the captured image smaller than the screen,
- the width of the display item is changed between the full display and the frame display, and
- the display item is displayed with a width smaller than the display item displayed for the frame display in a case where the captured image is being displayed by the full display.

15. A non-transitory computer-readable storage medium that stores a program for causing a computer to execute a control method of a display control apparatus including a display unit, the control method comprising:
- receiving a tally signal from an external apparatus; and
- performing control so that a captured image captured by an imaging unit is displayed on the display unit and performing control, in accordance with having received the tally signal, so that a display item that indicates that the tally signal has been received is displayed along the edge of the display unit, wherein
- display of the captured image is changed, in accordance with a user operation, between a full display in which the captured image is displayed on the entirety of a screen of the display unit and a frame display in which a margin area around the captured image is provided by displaying the captured image smaller than the screen,
- the width of the display item is changed between the full display and the frame display, and
- the display item is displayed with a width smaller than the display item displayed for the frame display in a case where the captured image is being displayed by the full display.

16. A display control apparatus including a display unit, the apparatus comprising:
- a receiving unit configured to receive a tally signal from an external apparatus; and
- a display control unit configured to perform control so that a captured image captured by an imaging unit is displayed on the display unit and, in accordance with the receiving unit having received the tally signal, to perform control so that a display item that indicates that the tally signal has been received is displayed along the edge of the display unit, wherein
- the display control unit switches, in accordance with a user operation, between a full display in which the captured image is displayed on the entirety of a screen of the display unit and a frame display in which a margin area around the captured image is provided by displaying the captured image smaller than the screen,
- the display control unit changes the width of the display item between the full display and the frame display, and
- the display control unit performs display of information received along with the tally signal in the margin area in a case where the captured image is being displayed by the frame display.

* * * * *